United States Patent [19]

Koleff

[11] 4,436,261

[45] Mar. 13, 1984

[54] V/STOL AIRCRAFT

[76] Inventor: Kolio Koleff, 1440 County Line Rd., Alden, N.Y. 14004

[21] Appl. No.: 328,250

[22] Filed: Dec. 7, 1981

Related U.S. Application Data

[63] Continuation of Ser. No. 142,914, Apr. 23, 1980, abandoned.

[51] Int. Cl.³ .............................................. B64C 15/00
[52] U.S. Cl. ..................................... 244/51; 244/1 R; 244/36; 244/52
[58] Field of Search ........................ 244/51, 52, 56, 57, 244/60, 66, 12.2, 12.4, 23 C, 36, 120, 130, 1 N, 218

[56] References Cited

U.S. PATENT DOCUMENTS

| | | | | |
|---|---|---|---|---|
| 1,917,503 | 7/1933 | Crump | | 440/53 |
| 2,922,277 | 1/1960 | Bertin | | 244/12.2 |
| 2,939,648 | 6/1960 | Fleissner | | 244/12.2 |
| 3,258,916 | 7/1966 | Lehmann | | 244/52 |
| 3,415,216 | 12/1968 | Strobel | | 440/53 |
| 4,366,936 | 1/1983 | Ferguson | | 244/36 |

FOREIGN PATENT DOCUMENTS 2248526 4/1974 Fed. Rep. of Germany ..... 244/12.4

Primary Examiner—Trygve M. Blix
Assistant Examiner—Thomas J. Brahan
Attorney, Agent, or Firm—Allen J. Jaffe

[57] ABSTRACT

Various forms of V/STOL aircraft are disclosed, each having a tiltable exterior structure that is in the shape of a pair of connected partial circular conoids. In one general form the conoids house the thrust producing engines, whereas in another form they are immediately downstream thereof. Also provided is a sonic boom concentrator in the form of a fin having curved sidewalls and truncated ends.

9 Claims, 16 Drawing Figures

V/STOL AIRCRAFT

This is a continuation of application Ser. No. 142,914, filed Apr. 23, 1980, now abandoned.

BACKGROUND OF THE INVENTION

The present invention relates primarily to V/STOL aircraft and, more particularly, to such aircraft having tilting propellers, turbines or nozzles.

Such aircraft are known wherein the tiltable exterior structure thereof is generally streamlined to minimize drag or instabilities associated with movement from one position to another. However, since the streamlined shape is generally symmetrical only about the longitudinal axis of such tiltable exterior structure, there is still generated some initial drag as the structure first begins to change position. As a result, the transition must be gradual and relatively slow.

SUMMARY OF THE INVENTION

The foregoing problem of the prior art, as well as others, are overcome according to the teachings of the present invention which provides in a V/STOL-type, heavier than air, aircraft an exterior tilting structure wherein the normal drag or instability associated with transitional movements thereof is virtually, if not entirely, eliminated. In this manner, changes in direction (such as from horizontal to vertical flight) can occur more abruptly and more quickly than is the case with presently known aircraft of this type.

Essentially, the present invention provides an exterior tiltable housing that is substantially symmetrical about all axes in the plane of rotation thereof. In this manner, an identical streamlined or smooth surface is exposed to the air flow regardless of the position of the tiltable housing. There is, thus, little or no change in the aerodynamic forces acting on the tiltable exterior structure irrespective of how fast movement occurs from one position to another.

The shape of the tiltable housing can best be described as that of two partial circular conoids having their bases connected by a curved circular peripheral edge, as will become apparent hereinbelow.

Basically, then, the present invention provides a V/STOL aircraft having thrust producing members which are mounted for tilting movement about an axis and an exterior housing movable therewith having an exterior shape that is symmetrical about all lines passing through said axis in the plane of rotation of said thrust producing member in all positions thereof.

BRIEF DESCRIPTION OF THE DRAWINGS

For a fuller understanding of the present invention, reference should now be had to the following detailed description thereof, taken in conjunction with the accompanying drawings, wherein.

DESCRIPTION OF THE PREFERRED EMBODIMENTS

Figure 1:
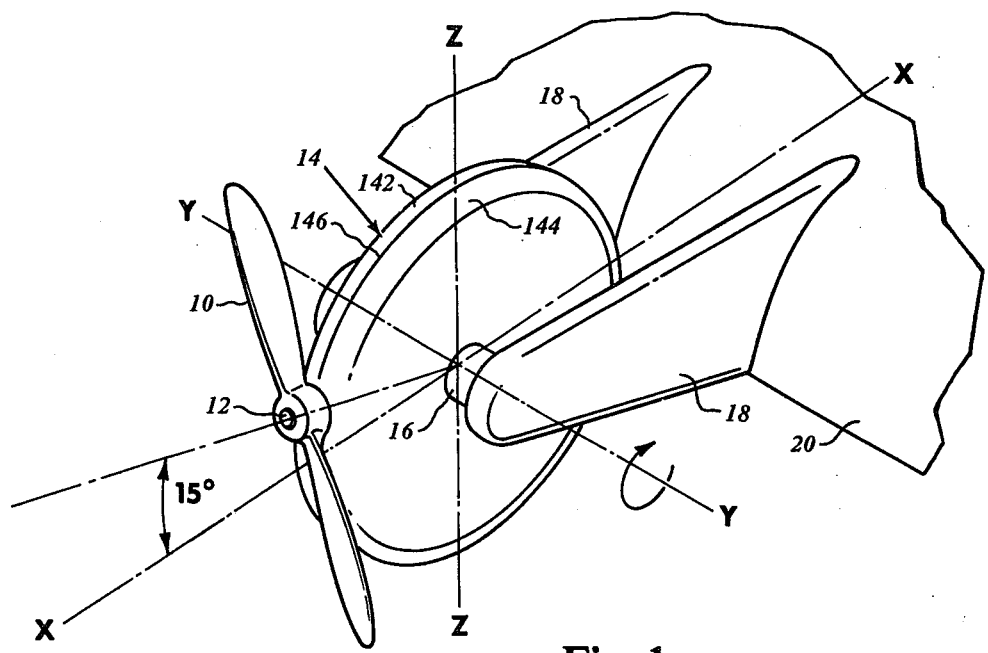
FIG. 1 is a partial pictorial view illustrating the tiltable exterior housing applied to a propeller.

Referring now to the drawings and, more particularly, to FIG. 1, a tiltable thrust producing member in the form of a propeller 10 is fixedly supported for rotation with a shaft 12, which receives power from a conventional engine (not illustrated). A housing 14 is supported for pivotal or tilting movement about an axis Y and is fixed to a pair of shafts 16 which is supported for pivotal movement by a pair of struts 18 protruding from the wing or body 20 of an aircraft.

It is important to note that housing 14 has an exterior shape that is symmetrical about all lines passing through the axis of shaft 16 in the plane of pivotal movement thereof about such axis. The housing has an exterior shape that can best be described as substantially that of two partial circular conoids 142 and 144 having their bases connected by a circular peripheral edge 146. This shape can also be described as that of two smooth based saucers or dishes abutting one another to form a closed hollow space or chamber therebetween. As clearly seen in the drawings, the outer surface of each of the conoids 142, 144 is maximally spaced from axis Y at its respective geometric center and is progressively and gradually spaced closer and closer to this axis from a surface thereof that is at such geometric center to the radial extremity or outer edge thereof.

For initial lift conditions the propeller 10 should be located in a position about 15 degrees from the horizontal X-axis, as is illustrated.

Figure 2:
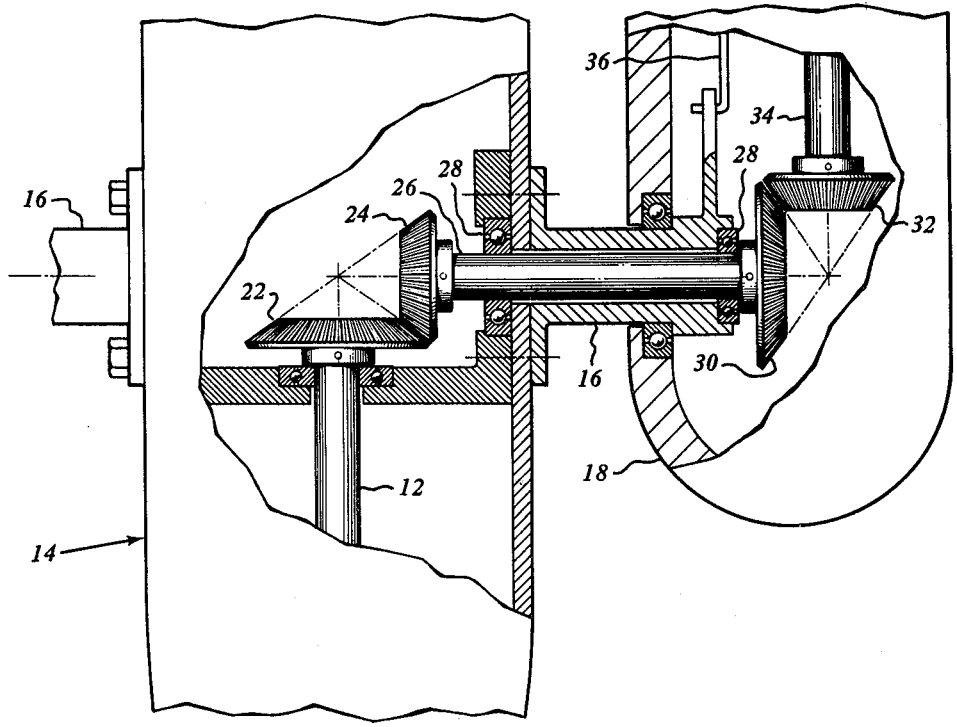
FIG. 2 is a detail of an exemplary control and power train for the tiltable housing of FIG. 1.
Figure 3:
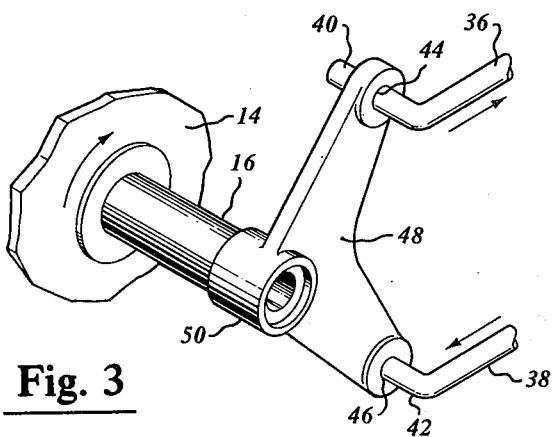
FIG. 3 is a fragmentary detail view of the control linkage of the power train of FIG. 2.

In the case where a propeller is employed as the thrust producing member, an exemplary manner in which power is transmitted thereto and in which pivotal movement of the housing 14 is accomplished is best illustrated in FIGS. 2 and 3.

Referring now to FIGS. 2 and 3, propeller shaft 12 is connected to a bevel gear 22 within the interior of housing 14. Gear 22 is driven by a right angled gear 24 at one end of shaft 26, which is rotatably supported within one of the shafts 16 by bearings 28 or the like. To the other end of shaft 26 is connected a bevel gear 30 which is driven by a perpendicular bevel gear 32 connected to a shaft 24 which receives rotary power from the engine (not illustrated).

Pivotal or tilting movement of housing 14 is accomplished by means of a pair of control linkages or cables 36 and 38 (FIG. 3) having the ends of each connected to a pilot's control panel or the like (not illustrated). The other end of cables 36, 38 form right angle bends 40, 42, respectively, that are fixedly retained in openings 44, 46, respectively, of a V-shaped link 48, the apex of which comprises a short cylindrical collar 50 which is fixedly secured to shaft 16 by means of a press fit or the like. Shaft 16, as previously indicated, is fixedly secured to exterior housing 14.

Prior to a discussion of the ramaining forms of the present invention, it will be instructive to discuss the operation of the basic arrangement thus far described.

Assuming the craft to which propeller 10 is attached is undergoing straight horizontal flight and it is desired to quickly change the direction thereof, the housing 14 is caused to pivotally move either clockwise or counterclockwise about axis Y by the action of either cable 36 or 38 through link 48. This motion will similarly permit propeller 10 to tilt or pivot clockwise or counterclockwise, as the case may be, due to the rotary freedom permitted by bearings 28.

The nature of the exterior shape of housing 14 will permit rapid movement thereof without the introduction of any transient drag forces as would be the case with conventional bullet-type streamlined housings. More specifically, since the same surface shape of housing 14 is presented to the air flow in all possible positions thereof about axis Y, no new forces are introduced as the same moves from one position to another. The result is an extremely stable transition under very abrupt or rapid maneuvers.

Figure 4:
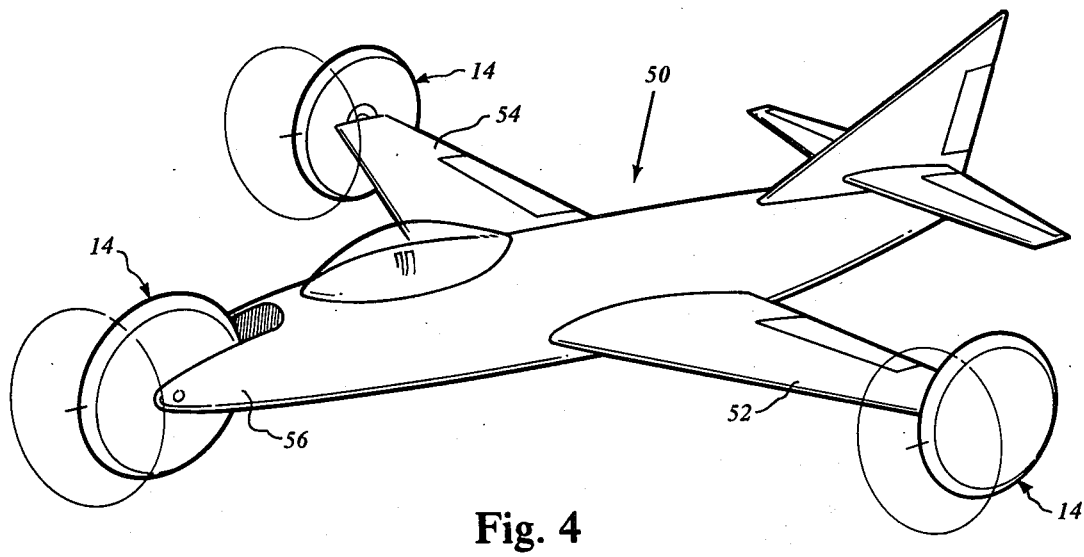
FIG. 4 is a pictorial view of a conventional propeller aircraft employing the structure of the present invention.

FIG. 4 illustrates a conventional propeller-driven aircraft 50 having two housings 14 at the tips of wings 42, 54 and one at the nose 56, thereof. The functional advantages and operational features of the shape of tiltable housings 14 are similar to that previously described.

Figure 5:
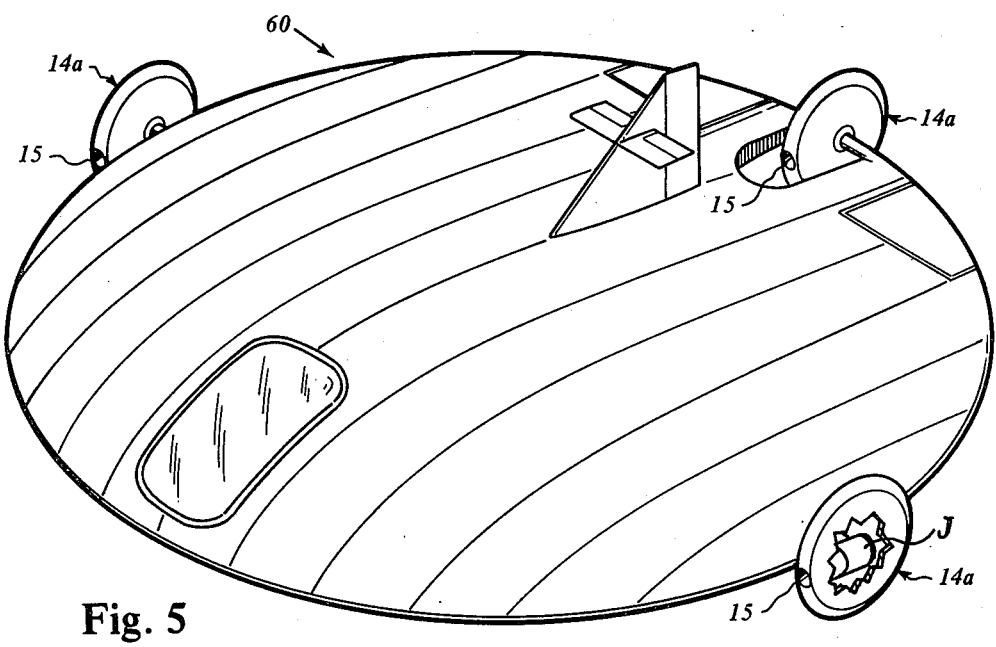
FIG. 5 is a pictorial view of single wing jet craft according to the present invention.

FIG. 5 illustrates a modification wherein the tiltable housing according to the present invention is applied to a single wing saucer-shaped craft 60'. In this embodiment, conventional jet engines J may be housed within three tiltable housings 14a, one of which being located at the rear of the craft, whereas the other two being mounted on opposite sides thereof. The jet intake ports are illustrated at 15, whereas the exhaust ports coaxial therewith are not illustrated. The manner in which pivotal movement or tilting of the jet housings are accomplished can be similar to that previously described with respect to FIGS. 1-3, except that no power train would be necessary. Other ways that are conventional could also be employed.

Figure 6:
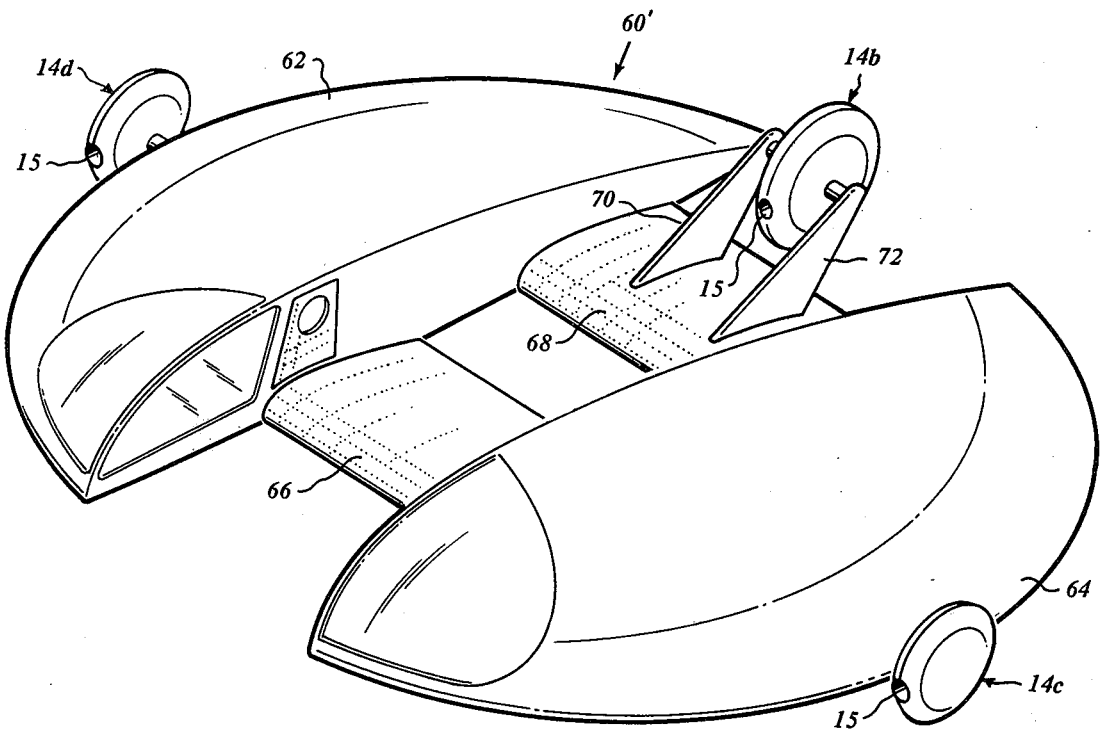
FIG. 6 is pictorial of a modification of the craft of FIG. 5.
Figure 7:
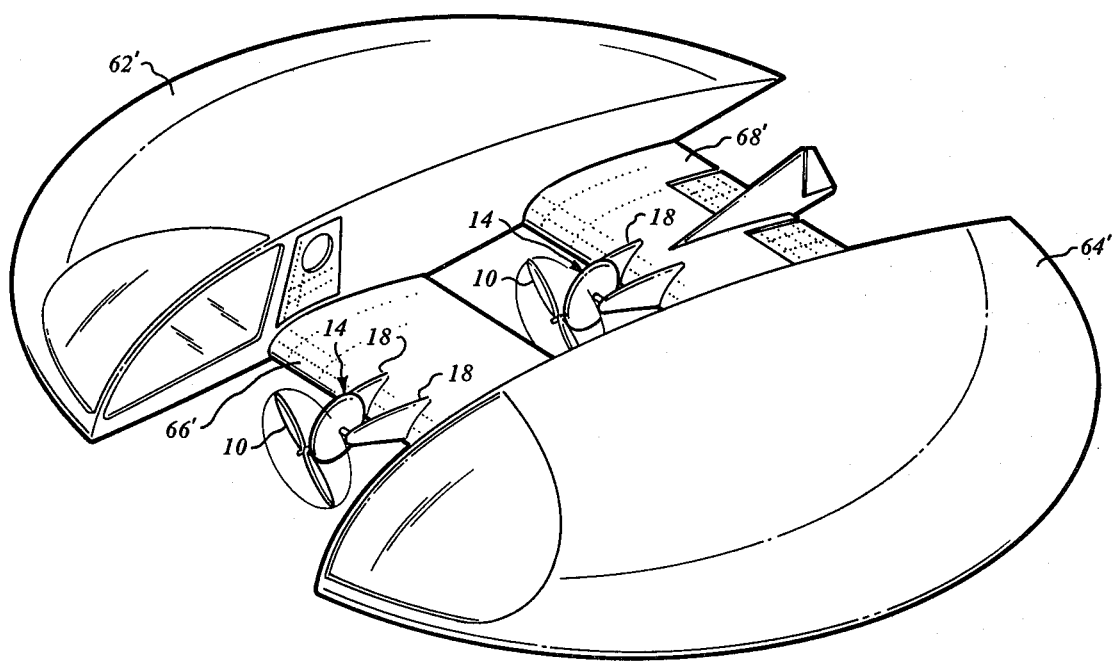
FIG. 7 is a pictorial view of the modification of FIG. 6.

FIG. 6 illustrates a modification of FIG. 5 wherein the craft 60 is formed of two telescoping sections 62 and 64 along supports 66 and 68. A rear tiltable jet housing 14b is supported by a pair of struts 70 and 72. A pair of similar side-mounted housings 14c and 14d are pivotally attached to the sections 62 and 64, respectively. As is well known, the telescoping sections will permit more lift, when expanded, during takeoff and hover flight and, when contracted, will permit less drag during normal high-speed flight.

FIGS. 7 through 11 illustrate a modification of the craft of FIG. 5 wherein the only substantial change is that thrust producing propellers are provided instead of the jet engines.

Thus, telescoping sections 62' and 64' are provided which expand or contract along forward support 66' and rear support 68'. On the leading edge of each of these supports are provided a propeller thrust producing assembly, as previously described with respect to FIGS. 1 through 3. Therefore, the same numerals will be used to depict similar parts.

Figure 8:
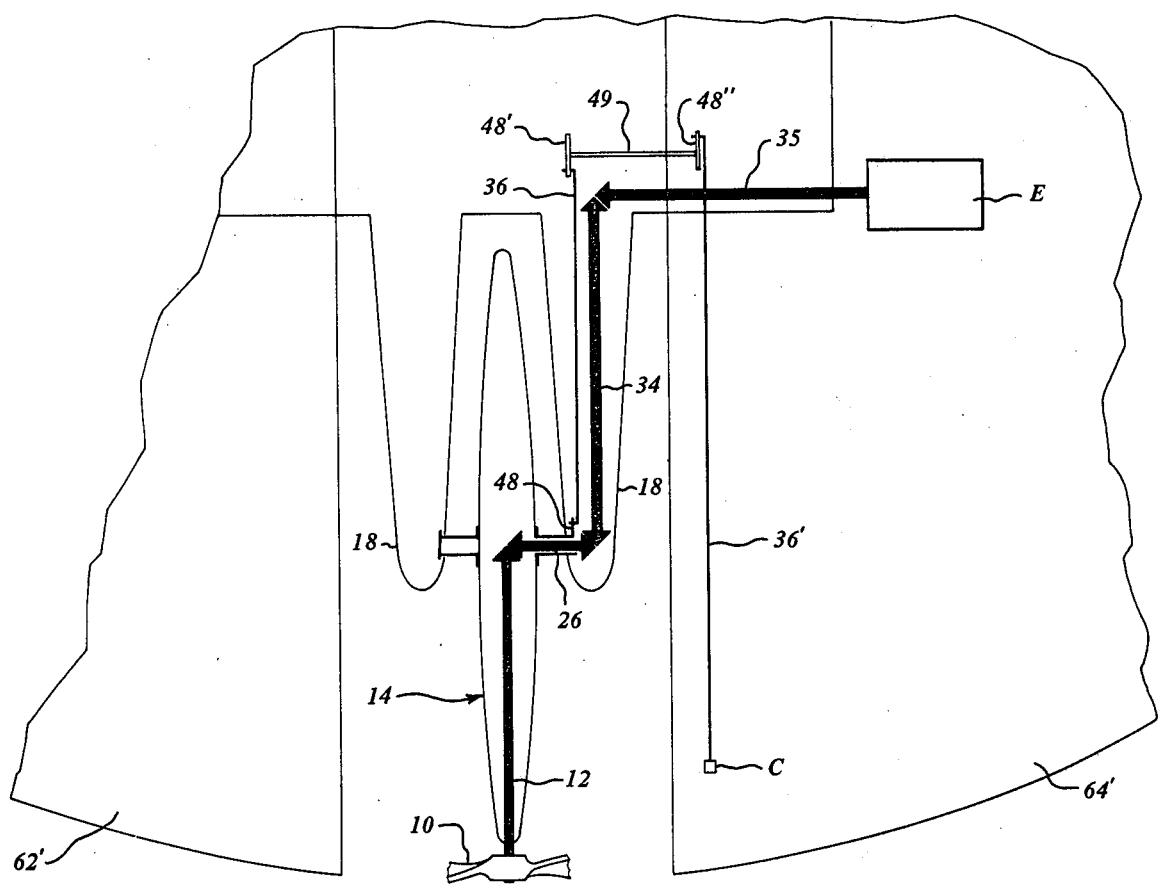
FIG. 8 is a fragmentary schematic of the power train of the craft of FIG. 7.

FIG. 8 illustrates in schematic form the manner in which rotary power is transferred from the engine E to the propeller 10 by means of a gear train, indicated in solid black, similar to that illustrated in 2, except that an additional geared drive shaft 35 from engine E is provided to coact with shaft 34.

FIG. 8 also depicts, in schematic form, the manner in which the pivotal housing is caused to tilt by means of control linkages similar to that illustrated in FIGS. 2 and 3 plus additional linkages to pilot controls C. Thus, in response to a pilot's signal the control C, which may be hydraulic, is actuated to cause linkage 36' to move V-shaped member 48" about shaft 49 which, in turn, causes V-shaped member 48' to move link 36 to pivot V-shaped member 48. This pivotal movement will cause housing 14 to tilt in the manner previously described in connection with FIGS. 1-3.

Figure 9:
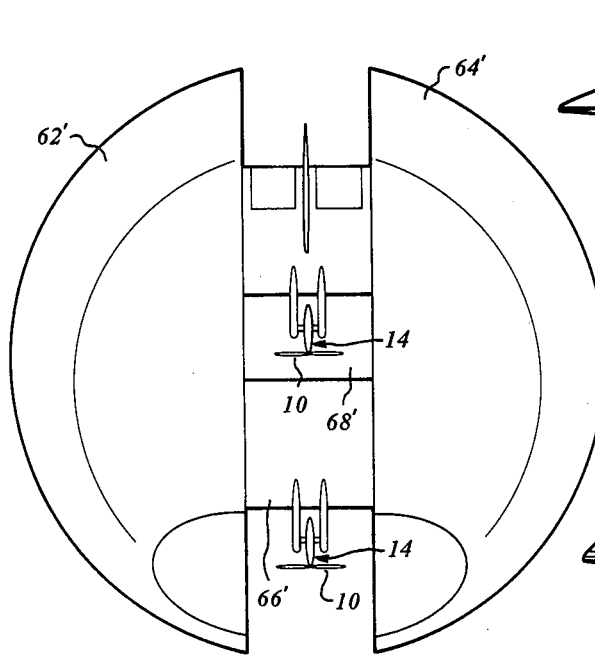
FIG. 9 is a schematic top view of the craft of FIG. 7.
Figure 10:
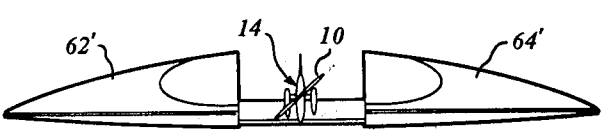
FIG. 10 is a front view of the craft of FIG. 9.
Figure 11:
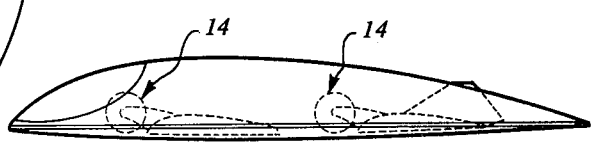
FIG. 11 is a side view of the craft of FIG. 9.

FIG. 9 is a top view of the modification of FIG. 8 and FIGS. 10 and 11 are front and side views thereof, respectively.

Figure 12:
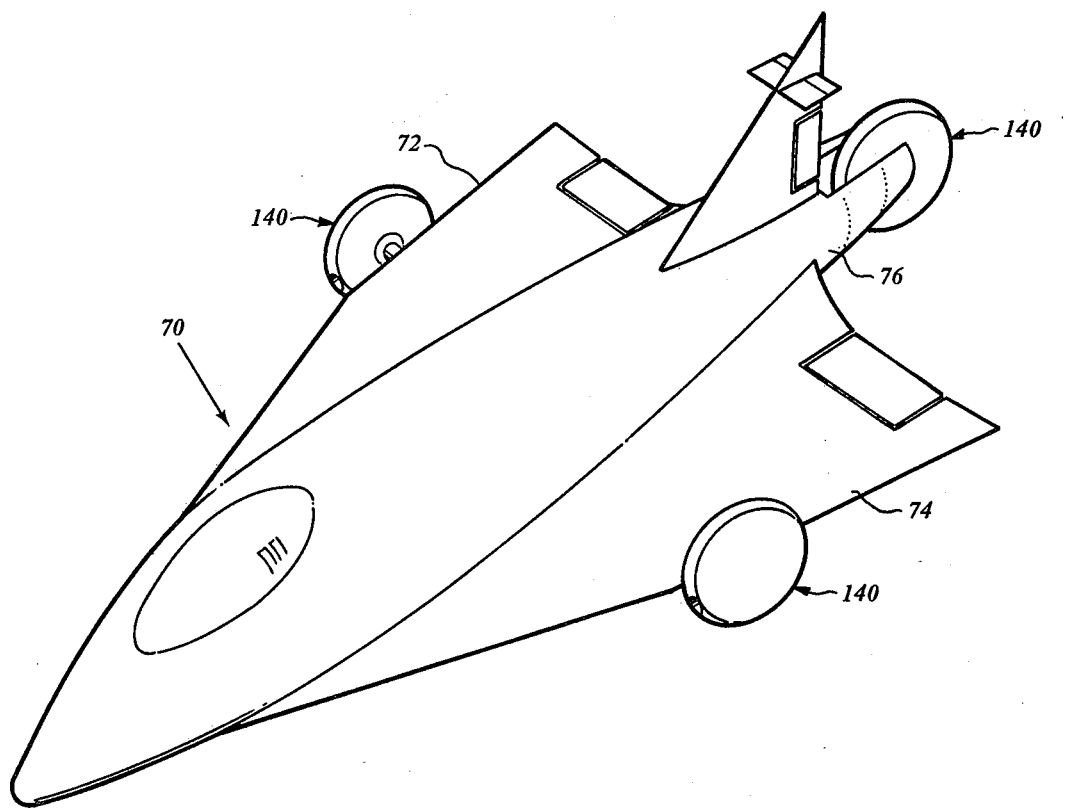
FIG. 12 is a pictorial view of a further modification.
Figure 13:
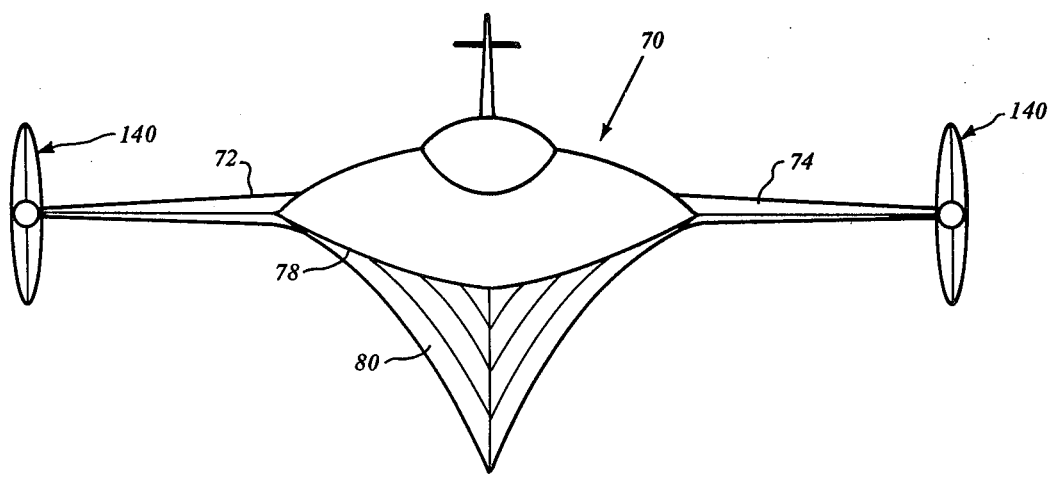
FIG. 13 is a schematic front view of the FIG. 12 modification.

Referring to FIGS. 12 and 13, the present invention is employed in a swept-back winged craft 70, wherein the wings 72, 74 and the tail 76 of which are provided with pivotal housings 140, similar to those previously described in connection with the FIG. 5 embodiment. Hence, no further description is deemed necessary at this point. However, it is important to note that the undersurface 78 (FIG. 13) has affixed thereto a sonic boom concentrator 80 extending substantially the entire longitudinal extent of the undersurface. The function and structure of this concentrator will be discussed more fully in connection with the embodiments of FIGS. 14-16.

Figure 14:
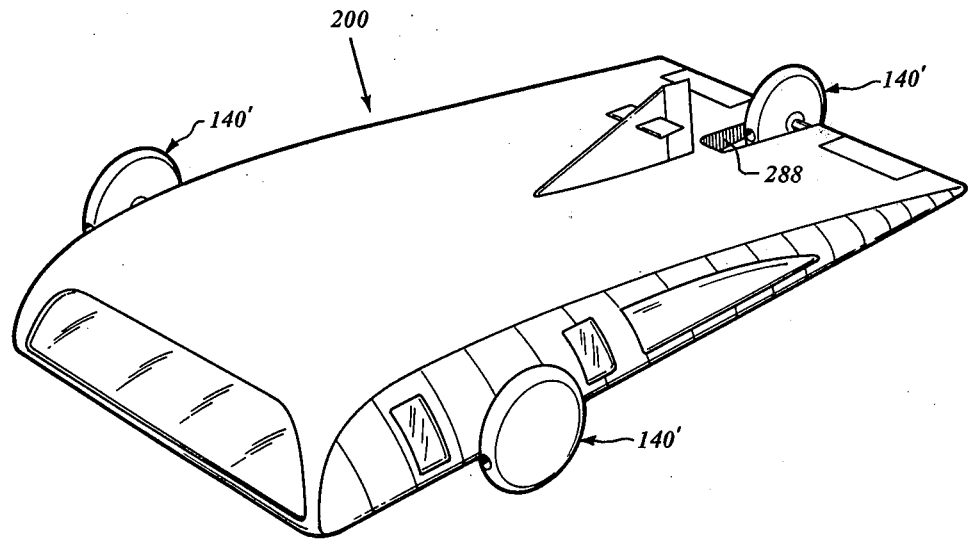
FIG. 14 is a pictorial of a still further modification.
Figure 15:
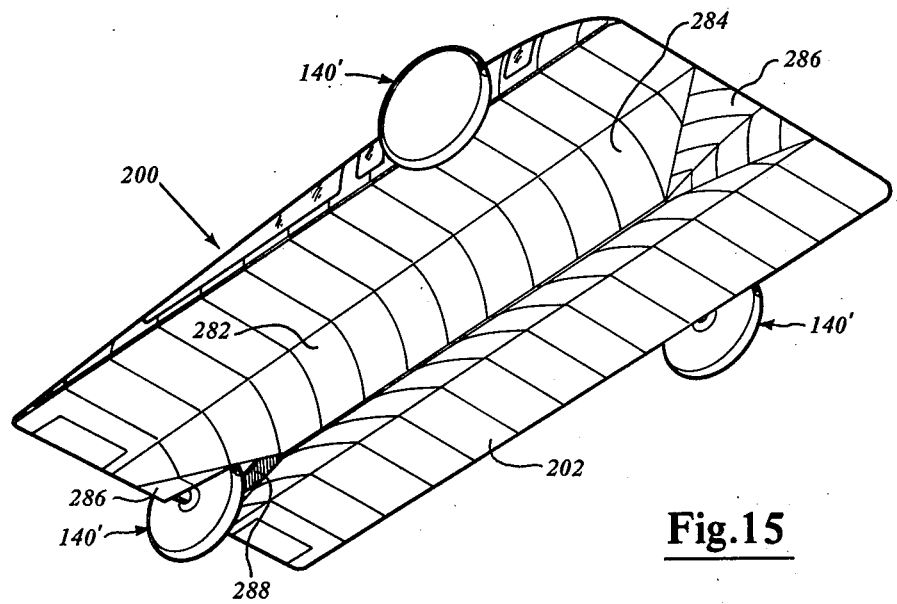
FIG. 15 is a pictorial view looking at the bottom surface of the FIG. 14 modification.
Figure 16:
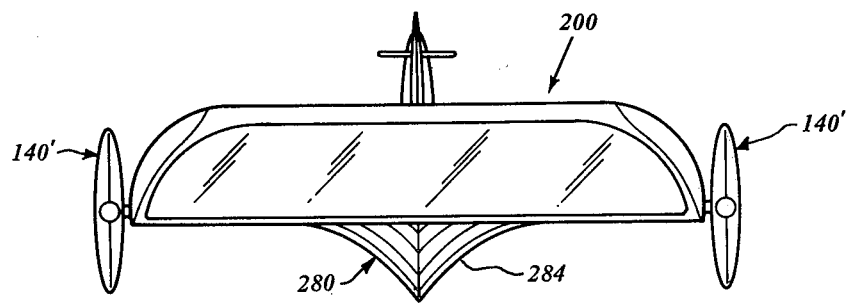
FIG. 16 is a front view of the FIG. 14 modification.

A still further embodiment of the invention is illustrated in FIGS. 14-16, wherein the tiltable housings 140' are affixed to opposite sides and the rear section of a substantially rectangular bodied craft generally depicted at 200. In this form, the tiltable housings contain jet engines in the manner previously described in connection with the FIG. 5 embodiment.

The undersurface 202 of craft 200 is substantially planar except for a centrally located sonic boom concentrator 280 projecting therefrom and extending substantially the entire axial extent thereof. Concentrator 280 is in the form of a V-shaped fin 282 having curved sidewalls 284 terminating in a truncated end or transition surface at the front of craft 200. The other end of fin 282 is similarly truncated at 286 except for a recess 288 to accomodate the engine containing housing 140'. The concentrator 280 functions to spread the sonic boom to ground along diverging lines that eminate from the curved side walls 284. In this manner, at supersonic speeds, the effects of the sonic shockwaves are minimized at ground level.

Although preferred embodiments of the present invention have been disclosed and described, changes will obviously occur to those skilled in the art without any departure when the spirit thereof. For example in the forms where the tiltable housing contain jet engines, it is within the purview of the present invention that rocket engines could be employed in lieu thereof. It is therefore intended that the scope of the present invention is to be limited only by the scope of the appended claims.

I claim:
1. A V/STOL heavier than air aircraft, including:
an aircraft body;
a thrust producing member;

means for mounting said member exteriorly of said body in spaced relation thereto and constraining said member for pivotal movement, with respect to said body, about a single axis;

an exterior rigid housing spaced from said body and fixed for movement with said thrust producing member, said housing formed substantially in the shape of two smooth based dishes substantially in the shape of two partial circular conoids having their bases in abutting engagement, the outer surface of each of said conoids being maxially spaced from said axis at its respective geometric center and being progressively and gradually spaced closer and closer to said axis from a surface thereof that is at least adjacent said geometric center to the radial extremity thereof to provide a closed hollow chamber therebetween and being completely symmetrical about all lines which intersect said axis and which are contained within the plane of movement of said exterior housing in all pivotal positions thereof.

2. The V/STOL aircraft according to claim 1, wherein:
said thrust producing member comprises a propeller mounted for rotation about a second axis that is perpendicular to said first axis, and said propeller is supported by said exterior housing immediately upstream thereof.

3. The V/STOL aircraft according to claim 2, further comprising:
a rotary shaft passing through said exterior housing fixedly connected to said propeller for rotation therewith;
a first gear attached to said rotary shaft interiorly of said housing;
a second gear in mating engagement with said first gear;
said means for mounting comprises a hollow shaft fixed at one end to said exterior housing and connected at its other end to a linkage for causing pivotal movement of said housing about said first mentioned axis; and
a second shaft connected to said second gear and passing through said hollow shaft.

4. The V/STOL aircraft according to claim 1, wherein:
said thrust producing member comprises a jet engine fully located in said closed hollow chamber.

5. The V/STOL aircraft according to claim 1, wherein:
said means for mounting is supported by the body of said V/STOL aircraft.

6. The V/STOL aircraft according to claim 5, further comprising:
a sonic boom concentrator in the form of a longitudinally extending fin depending from said body having curved sidewalls and substantially truncated ends.

7. The V/STOL aircraft according to claim 5, wherein:
said body is substantially circular in shape.

8. The V/STOL aircraft according to claim 5, wherein:
said body is substantially triangular in shape; and there is further provided
a sonic boom concentrator in the form of a longitudinally extending fin depending from said body having curved sidewalls and substantially truncated ends.

9. The V/STOL aircraft according to claim 5, wherein:
said body is substantially rectangular in shape; and there is further provided
a sonic boom concentrator in the form of a longitudinally extending fin depending from said body having curved sidewalls and substantially truncated ends.

* * * * *